United States Patent [19]

Czernik et al.

[11] 4,325,559
[45] Apr. 20, 1982

[54] EROSION RESISTANT GASKET

[75] Inventors: Daniel E. Czernik, Hinsdale; Donald J. McDowell, Riverside, both of Ill.

[73] Assignee: Felt Products Mfg. Co., Skokie, Ill.

[21] Appl. No.: 149,120

[22] Filed: May 12, 1980

[51] Int. Cl.³ ............................................... F16J 15/06
[52] U.S. Cl. .............................. 277/235 B; 277/Dig.6
[58] Field of Search ................. 277/Dig. 6, 235 B, 22, 277/166

[56] References Cited

U.S. PATENT DOCUMENTS 2,055,471  9/1936  Balfe ................................. 277/235 R
2,644,804  7/1953  Rubin ............................. 277/DIG. 6
4,121,846  10/1978  Skryski .......................... 277/235 R

FOREIGN PATENT DOCUMENTS 1278321  6/1972  United Kingdom ............ 277/235 B

Primary Examiner—Robert I. Smith
Attorney, Agent, or Firm—Dressler, Goldsmith, Shore, Sutker & Milnamow, Ltd.

[57] ABSTRACT

A multi-layer engine gasket is provided for resisting scoring, scratching and abrasive-erosion. The gasket assembly includes a flat-elongated core or base, a sheet of composite gasket material on each face of the base, armor to seal the combustion chambers, and an exterior layer of erosion resistant material applied to the facing sheets along one or more of the two shorter ends of the gasket assembly. Apertures are provided for the combustion chambers, the water and fluid passageways and the head bolts. The abrasive-erosion resistant layer is a mixture of molybdenum disulfide and graphite, preferably with a minor amount of a binder and adhesion promoter. The abrasive-erosion resistant layer is selectively applied to the end zones of the gasket assembly.

4 Claims, 3 Drawing Figures

EROSION RESISTANT GASKET

BACKGROUND OF THE INVENTION

This invention relates to a fluid seal, and more particularly, to a gasket adapted to be mounted between an engine head and block of an internal combustion engine, such as a diesel engine.

The current energy crisis has given rise to an array of lightweight, high output, gasoline and diesel engines, both aspirated and turbocharged. One result of this shift to lighterweight engines, for a number of reasons, is an increased potential for the abrasive-erosion of gaskets or abrasive gasket erosion. Abrasive gasket erosion occurs when a gasket is placed between and in contact with the engine block and cylinder head and then subjected to a substantial compressive load or stress and high frequency, cyclic impulse forces and vibrations generated by the engine. These forces and vibrations tend to impart very slight relative movement between confronting engine surfaces and the gasket.

The search for lighter-weight engines has also resulted in fewer headbolts and less efficient bolting patterns. In each case hold down torque is reduced below the optimum value. Typically, the gasket must withstand combustion pressures of 7,000 kilopascals (kPa)* in a naturally aspirated spark-ignition engine and 19,000 kilopascals or higher in a turbocharged diesel engine. Because of these high stresses, lighterweight castings and lighterweight, less rigid materials when used to form cylinder heads and engine blocks tend to result in greater relative motion between the two bolted together components and the sealing gasket.

*1 pascal=1 newton/meter$^2$=1.450377×10$^{-4}$ psi

A number of possible solutions have been proposed to eliminate or reduce the potential for abrasive-erosion, many of which are impractical. For example, softer smoother materials which are less likely to erode the gasket could be used. Also, increasing surface hardness by shot-peening or cold-working decreases the tendency for the gasket to be eroded by the metal surfaces. This solution, however, requires, in some cases, that the entire engine assembly be redesigned which, in many cases, is very expensive if not totally impracticable. Another possibility would be to decrease the compressive loading at the bearing surfaces. Although this would reduce the forces tending to cause erosion, the sealing effect of the gasket would also be reduced, and even then that might not solve the problem because even very small loads are capable of producing damage by abrasive-erosion. Still another solution would be to lubricate the surfaces with high-viscosity, high-tenacity oils, greases or lubricants. Thus, while there are a variety of approaches that may be taken to reduce gasket erosion these approaches must be considered against their effects on the overall sealing capacity of the gasket.

Further, an important physical property of any gasket is good torque retention. In general, torque retention is associated with the amount of compressible material in a gasket and the compression set characteristics of the gasket material. Specifically, if the amount of compressible material is reduced, torque retention improves. Nevertheless, even when thin materials are used, there must be sufficient compressibility consistent with a good seal. Thus, a problem is presented in maintaining good torque retention while at the same time resisting the effects of abrasive-erosion through the application of erosion resistant materials. In other words, one cannot simply add materials to a gasket assembly without recognizing the potential for increased compression set and long term torque loss.

SUMMARY OF THE INVENTION

In accordance with the present invention, there is provided a gasket assembly adapted to be positioned between an engine block and head. The gasket assembly includes a metal gasket body having first and second generally planar surfaces defining at least one piston-size combustion opening and fluid-flow passageways, and armor around the combustion openings. A layer of sealing material is applied to each of the two planar surfaces to form a composite laminated gasket assembly.

In the case of an engine having a plurality of combustion chambers arranged in a line, a layer of abrasive-erosion resistant material is applied to selected portions of the gasket assembly at each end of the gasket. This arrangement of materials provides abrasive-erosion resistant materials in those critical areas of the gasket assembly where abrasive-erosion is most likely to occur. In addition, the gasket assembly is kept as thin as possible consistent with the applied forces so as to preserve and enhance the torque retention characteristics of the gasket assembly.

The preferred thickness of abrasive-erosion resistant layer is between about 0.002 and about 0.012 inch. The layer of abrasive errosion resistant material contains molybdenum disulfide and graphite preferably in a ratio of from about 25% to about 75% molybdenum disulfide and from 75% to about 25% graphite by weight and, based on that total weight, a minor amount of from about 5% to about 25% by weight of a binder and adhesion promoter, such as a silicone or phenolic resin. This layer also resists scoring and scratching of the engine block and the cylinder head. Thus, the gasket assembly is able to withstand a substantial compressive load or stress and high frequency, cyclic impulse forces and vibrations over a long period of time without adversely affecting the torque retention characteristics of the gasket assembly.

Numerous other advantages and features of the present invention will become readily apparent from the following detailed description of the invention and an embodiment thereof, from the claims and from the accompanying drawings.

DETAILED DESCRIPTION OF THE ILLUSTRATIVE EMBODIMENT

Figure 1:
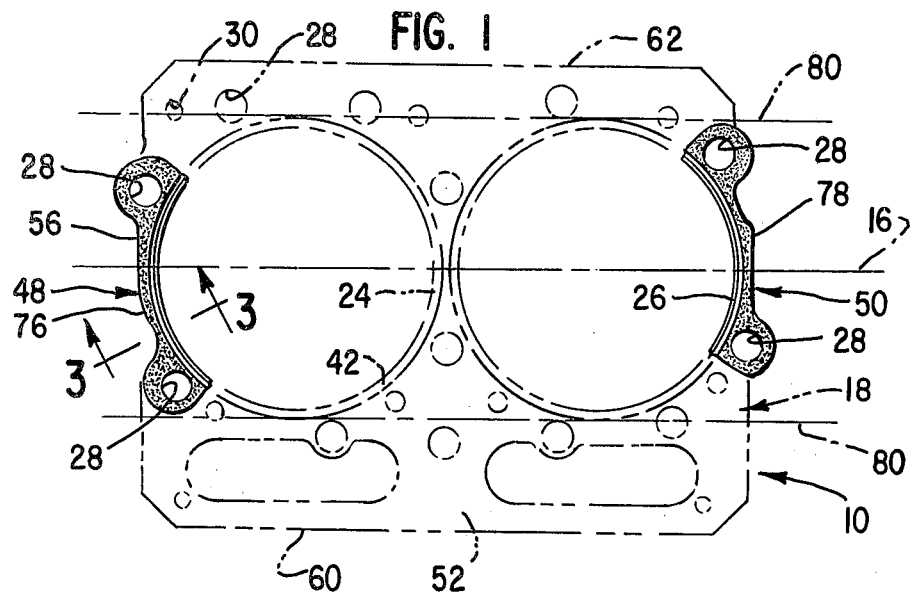
FIG. 1 is a top plan view of an abrasive-erosion resistant diesel engine gasket assembly incorporating the principles of the present invention.

Referring to the drawings, the abrasive erosion resistant diesel engine gasket assembly 10 is especially configured and constructed to be used in an internal combustion engine 12 having a plurality of combustion cylinders 14 (only one being shown in FIG. 2) arranged along a line 16 defining the longitudinal axis of the engine. Although it is clear that gasket assemblies made in accordance with this invention can be used with an engine having only one combustion opening, the invention will be illustrated by a multi-combustion opening gasket assembly and engine. Specifically, the abrasive-erosion resistant gasket assembly 10 includes main body portion 18 having a generally flat metallic core or base 19. The base 19 has an elongated top or first generally planar surface 20 and an elongated bottom or second generally planar surface 22. The top and bottom surfaces 20, 22 are generally parallel to each other.

A sheet of composite compressible gasket facing material 52, 54 different from the material of the base 19 is applied to each side of the base. Facing sheets 52, 54 are fiber reinforced and are attached mechanically or adhesively to the two surfaces 20, 22 of the metal gasket base 19. The most popular and frequently used facings incorporate asbestos or glass fibers and utilize nitrile, neoprene or polyacrylic elastomers to provide the self-sustaining facings. In the embodiment illustrated, the facings have a thickness of about 0.025 inch, although, of course, this may vary with the application. Facing sheets 52, 54 generally resist degradation by oils and coolants, retain torque, minimize extrusion, and exhibit heat resistance.

The main gasket body 18 is die cut or blanked out, such as with a stamping machine, punch press or other suitable form of equipment to provide a pair of piston-size apertures or combustion openings 24 and 26, bolt holes 28, and a plurality of fluid flow passageways, such as oil and water passageways 30. A typical gasket assembly body 18 having the configuration shown in FIG. 1 has a thickness of about 0.080 inch. Other configurations and thicknesses may be used depending upon the configurations and requirements of the engines with which the gasket assembly is to be used. Typical gasket body constructions are described in U.S. Pat. No. 3,565,449 assigned to the assignee of the present invention.

Figure 2:
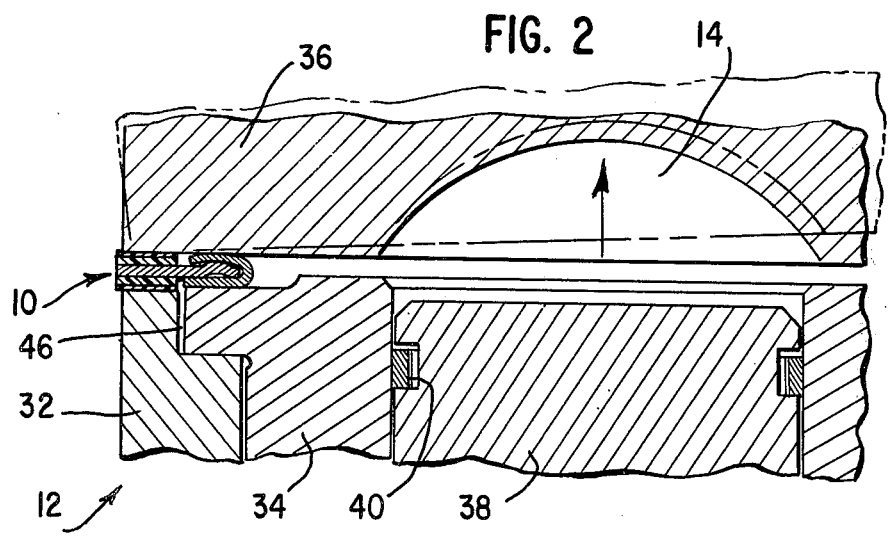
FIG. 2 is a partial cross-sectional elevational view of a diesel engine incorporating the gasket assembly shown in FIG. 1 and illustrating the relative motion between the engine block and cylinder head leading to abrasive-erosion.
Figure 3:
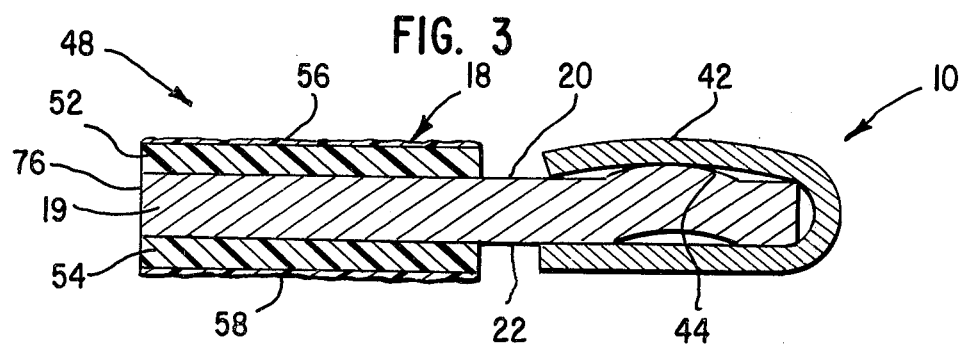
FIG. 3 is an enlarged cross-sectional view of a fragmentary portion of the abrasive-erosion resistant diesel engine gasket assembly taken along line 3—3 of FIG. 1.

FIG. 2 illustrates one application of the gasket assembly shown in FIG. 1. Specifically, the engine 12 includes an engine block 32 having a liner 34, and a cylinder head 36. The cylinder head 36 and the liner 34 define at least two combustion chambers 14 (only one of which is shown). Each combustion chamber 14 contains a piston 38 joined to the crankshaft (not shown). The combustion chamber 14 is sealed by a piston ring 40 carried by the piston 38. The gasket assembly 10 is juxtaposed between the engine block 32 and cylinder head 36.

The specific embodiment of the gasket assembly 10 illustrated in the figures further comprises armor 42 in the combustion openings to protect the main body portion 18 of the gasket from the combustion chambers 14 and to seal-off the main body portion from the combustion gases. The thickness and configuration of the armor 42 is a function of a number of factors known to those skilled in the art. For example, high output engines such as turbocharged engines normally require stainless steel armor for improved high temperature and fatigue resistance. In diesel engines, an armored gasket incorporating a wire ring is often used to provide sealing at the increased combustion pressures experienced in operating those engines.

In the embodiment shown, the base 19 is embossed adjacent the combustion openings 24, 26 to form an embossment 44 which is embraced and ensheathed by the U-shaped armor 42. By varying the height and/or width of the embossment 44 a wide range of load compression properties can be maintained. Preferably, the armor 42 is made from stainless steel.

In accordance with this invention abrasive-erosion of the gasket assembly 10 and the associated engine 12 is minimized. Abrasive-erosion appears to be the result of the microscopic repeated displacement of the cylinder head 36 relative to the engine block 32 and gasket assembly 10. The pressure produced by combustion within the combustion chambers 14 results in a pressure-force being applied to the interior surfaces of the combustion chamber. Usually, because the cylinder head 36 is less massive than the engine block 32, the relative motion between the cylinder head 36 and the engine block 32 can be visualized as the result of the cylinder head 36 moving relative to a fixed or rigid engine block 32. Sometimes, however, the block may flex, especially where lightweight, hollowed-out blocks are used.

Relative motion can be due to a variety of factors. These factors include the relative rigidity of the engine head and block at differing locations, the strength, placement and spacing of the bolts used to hold the engine block and head together, and the relative dimensions of the head and block. Some of these factors also depend upon the number and position of the cooling water passageways and the location and number of intake and exhaust ports. Accordingly, it is difficult to predict in a given engine where the relative movement which induces abrasive-erosion will occur. However, it is usually at two spaced apart opposite ends of a gasket assembly. Consequently, for each gasket assembly and engine, it is necessary to determine where abrasive erosion occurs and then to locate the abrasive-erosion resistant material at those ports.

Usually, in an elongated, multi-combustion opening gasket, abrasive-erosion will occur at the longitudinal ends of the gasket assembly. Movement inducing abrasive-erosion is schematically depicted in FIG. 2 where, for purposes of illustration, it is assumed that the engine head 36 moves from its full line position to the phantom position with respect to a stationary rigid block 32 due to compression forces. These forces may produce a generally upward force and a displacement along the axis 16 of the combustion chambers 14. As a consequence, the relative amount of motion or displacement is at a maximum at each end of the engine 12. In particular, it has been determined that where gaskets encounter wear and erosion at each of two opposite ends of a gasket, such as gasket assembly 10, that wear is usually in the zones 48 and 50 at the very ends of the assembly within the area bounded by lines 80 tangential to the peripheries of the several combustion openings 24, 26, the sides of the combustion openings facing the ends 76, 78 of the gasket assembly, and the gasket assembly ends themselves. In those zones 48, 50 the facing materials 52, 54 gradually tend to fail due to abrasive-erosion. This, in turn, leads to the escape of combustion gases and the eventual failure of the engine 12.

Accordingly, zones 48 and 50 are provided with superposed layers 56, 58 of material which substantially eliminates the abrasive-erosion of the facing material. The layers 56, 58 are preferably formed from a mixture of graphite, molybdenum disulfide and a binder and adhesion promoter, such as a silicone or phenolic resin. A specific material contains molybdenum disulfide, graphite, and silicone resin in the ratios respectively of 45, 42, and 13 parts by weight. Preferably both the top and bottom surfaces of the main gasket body 18 are provided with a substantially uniform layer of the mixture in a thickness of from about 0.002 and about 0.012 inch in zones 48, 50. These layers 56, 58 preferably contain molybdenum disulfide and graphite in a ratio from about 25% to about 75% molybdenum disulfide and from about 75% to about 25% graphite by weight, and, based on that total weight, from about 5% to 25% by weight of a binder and adhesive promoter such as a silicone or phenolic resin. These layers 56, 58 may be applied to the facing 52, 54 of the gasket body 18 by means of a silk screening process, such as that described in U.S. Pat. No. 3,477,867.

The actual extent to which the layers 56, 58 are applied at either end of the gasket body 18 is largely dependent upon achieving an adequate seal and at the same time reducing the tendency for abrasive erosion. In general, and as shown in FIG. 1, these layers 56, 58 are applied in the zones 48, 50 indicated so as to include the space provided for the bolt holes 28 at the ends of the engine 12. Typically, an abrasive-erosion resistant layer is from about 0.080 to 0.130 inches in width except where the available space does not permit this application width. Preferably, the width of the layer is greater than 0.050 inches.

In summary, the abrasive-erosion material layers 56, 58, in contact with the engine block 32 and cylinder head 36 should substantially eliminate the tendency of the facing sheets 52, 54 to degrade, and reduce those engine failures attributable to abrasive-erosion of the facing layers. These results should be obtained without otherwise adversely affecting the performance of the gasket assembly 10.

Although one embodiment of the invention has been shown and described, it is to be understood that the various modifications and substitutions may be made by those skilled in the art without departing from the novel spirit and scope of the invention, and accordingly the invention is intended to embrace all modifications within the scope of the appended claims.

What is claimed is:

1. An abrasive-erosion resistant, elongated gasket assembly adapted to be positioned between an engine block and head, said engine defining at least two combustion chambers disposed along a longitudinal axis of said engine, said gasket comprising a main body portion including a gasket base providing a first surface and a second surface and a composite facing material on each said surfaces, said gasket assembly defining at least two combustion openings arranged in a line and a substantially uniform layer of an abrasive-erosion resistant material of from about 0.002 to 0.012 inch in thickness deposited only on a selected portion of said facing material at each of the two opposite longitudinal ends of said gasket base and within the areas bounded by lines tangential to the peripheries of the combustion openings, the sides of the combustion openings and the ends of said gasket base, thereby to resist abrasive-erosion of said gasket assembly.

2. The abrasive-erosion resistant gasket assembly defined in claim 1, wherein the facing material is fiber reinforced.

3. The abrasive-erosion resistant gasket assembly defined in claim 1, further comprising armor adjacent the periphery of each combustion opening thereby to seal off the main body portion from the combustion gases when the gasket assembly is in use.

4. The abrasive-erosion resistant gasket assembly of claim 1, wherein said layer is a mixture of molybdenum disulfide and graphite in a ratio from about 25 percent to about 75 percent molybdenum disulfide and from about 75 percent to about 25 percent graphite by weight and, based on that total weight, from about 5 percent to about 25 percent by weight of a binder and adhesion promoter.

* * * * *